United States Patent [19]

Roseveare et al.

[11] Patent Number: 5,268,940
[45] Date of Patent: Dec. 7, 1993

[54] REACTOR UPPER INTERNALS INSPECTION DEVICE

[75] Inventors: Ronald N. Roseveare, Evington; Thomas J. Smentek, Forest, both of Va.

[73] Assignee: The Babcock & Wilcox Company, New Orleans, La.

[21] Appl. No.: 970,751

[22] Filed: Nov. 2, 1992

[51] Int. Cl.[5] ............................................. G21C 17/00
[52] U.S. Cl. .................................... 376/249; 376/353
[58] Field of Search ............... 376/249, 247, 258, 353; 33/501, 501.5, 501.14, 567; 976/DIG. 214

[56] References Cited

U.S. PATENT DOCUMENTS

| | | | |
|---|---|---|---|
| 3,898,741 | 8/1975 | Casey | 33/178 F |
| 3,939,570 | 2/1976 | Loftus | 33/178 |
| 4,857,264 | 8/1989 | Veronesi et al. | 376/353 |
| 4,862,079 | 8/1989 | Chickering et al. | 324/227 |
| 5,001,841 | 3/1991 | Takigawa et al. | 33/551 |
| 5,078,955 | 1/1992 | Hydeman et al. | 376/248 |

Primary Examiner—Donald P. Walsh
Assistant Examiner—Meena Chelliah
Attorney, Agent, or Firm—Robert J. Edwards; D. Neil LaHaye

[57] ABSTRACT

An inspection device for the upper internals of a nuclear reactor comprising an elongated probe body which is lowered through a central aperture in a support plate that forms part of the upper internals and includes a plurality of vertically extending control rod apertures. Radial channels extend outwardly from the central aperture, each communicating with corresponding control rod apertures. A radially moveable transducer is mounted to the probe body and the latter is rotatable to a position for accessing each channel for radially moving the transducer into the channel. The transducer detects the profile of the channel. An area of particular interest is the area of communication between the channels and the control rod apertures. This area is susceptible to wear due to vibrations of the control rods.

5 Claims, 3 Drawing Sheets

REACTOR UPPER INTERNALS INSPECTION DEVICE

FIELD AND BACKGROUND OF THE INVENTION

The present invention is generally related to the inspection of nuclear reactors and more particularly to an apparatus for inspecting the upper internals containing the control rod guide structures in a nuclear reactor.

In nuclear reactors, control rod assemblies are used to control the reactivity of the reactor. The upper internals and control rod guide structures house and guide the control rod assemblies as they are raised from or lowered into the core. The guide structure is generally formed by one or more horizontally positioned plates above the reactor core. A centrally located vertical aperture and radial channels through each plate house and guide the control rods and control rod assemblies.

The known spider form of the assemblies passes through the slot-like channels as the rods are raised and lowered. The channels through the plate extend radially relative to the aperture. Each channel is provided with at least one cutout section that forms a C-shape or split tube shape in the channel. During normal reactor operation the control rod assemblies are withdrawn from the core. In this position, a relatively short length of the control rods extends into the core. The hydraulic flow of coolant through the upper internals causes the control rods to vibrate against the horizontal plate of the guide structure. This vibration causes wear of the control rods and horizontal plate, especially at the cutout sections of the channels in the plate. Substantial wear of the guide plate can have an adverse effect on the normal operation of the control rods. Thus, it becomes important to know the extent of wear in the guide structure since proper reactor control is directly related to proper control rod movement. See, for example, U.S. Pat. Nos. 4,728,488, 4,863,678 and 4,902,468.

Inspection of this plate presents special problems. The radial channels and central aperture are complex in shape. Difficulty in accessing the plates, radioactive contamination and high radiation levels, and the need for precise inspection measurements preclude a close visual inspection.

SUMMARY OF THE INVENTION

The present invention addresses the aforementioned problems in a straightforward manner. An inspection device is provided that detects the profile of the support plate in the upper internals, at interface points with the control rods. A probe body is attached to an outer housing support that is used to position the probe body axially for inspection of the upper internals support plate. The probe body is provided with upper and lower inflatable bladder sections that align and secure the probe body in the center of the upper internals support plate.

Accordingly, an object of the present invention is to provide an inspection device for the upper internals of a nuclear reactor having a support plate with a central aperture, a plurality of radial channels extending outwardly from the central aperture, and at least one control rod aperture communicating with each channel, the device comprising an outer housing support for raising and lowering a probe body through the central aperture, a probe support connected to the probe body, rotation drive means connected to the probe support and probe body for rotating the probe body. A profile transducer senses the profile of a radial channel in the support plate, transducer drive means is connected between the probe body and the transducer for moving the transducer radially with respect to the probe body, and centering means is connected to the probe body for centering the probe body in the central aperture of the plate. With the probe body lowered by the outer housing support into the central aperture, the rotation drive means is operable to rotate the probe body into a rotational position for moving the transducer radially into one of the radial channels, and the transducer drive means is operable for moving the transducer radially into and along said one of the channels and the rod aperture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
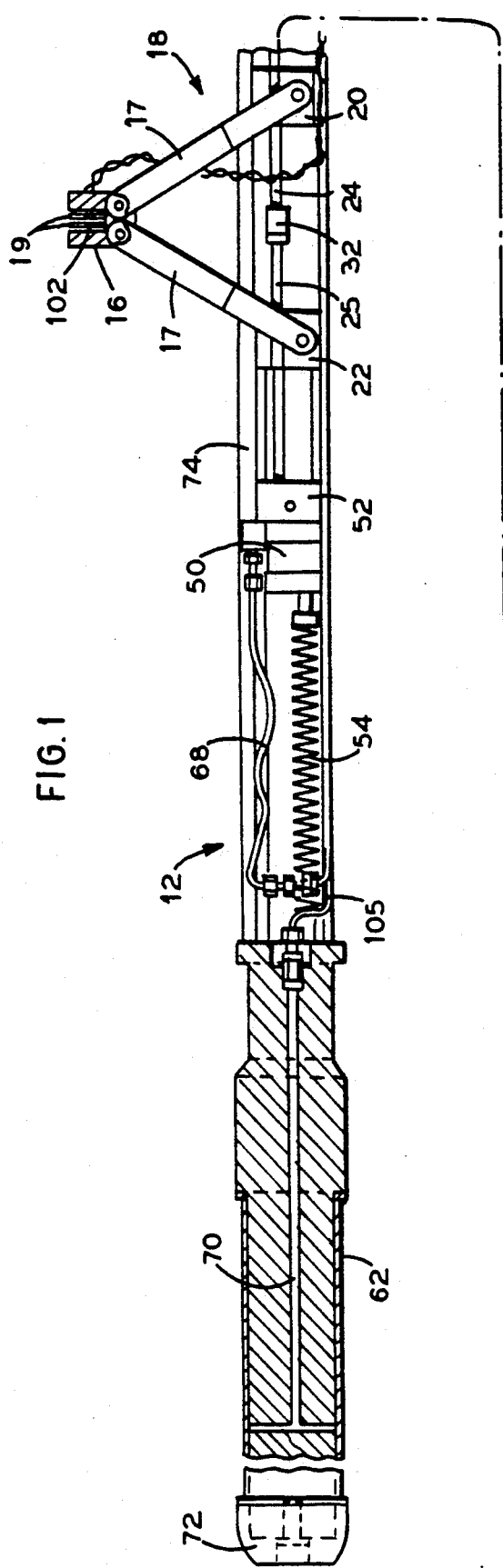
FIG. 1 is a composite longitudinal sectional view of the probe device according to the present invention.
Figure 1:
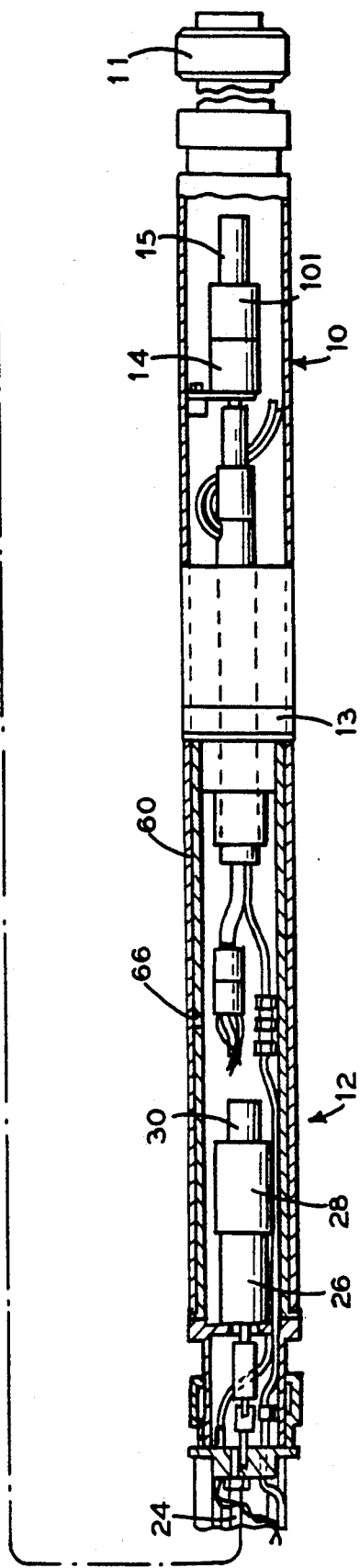
Figure 4:
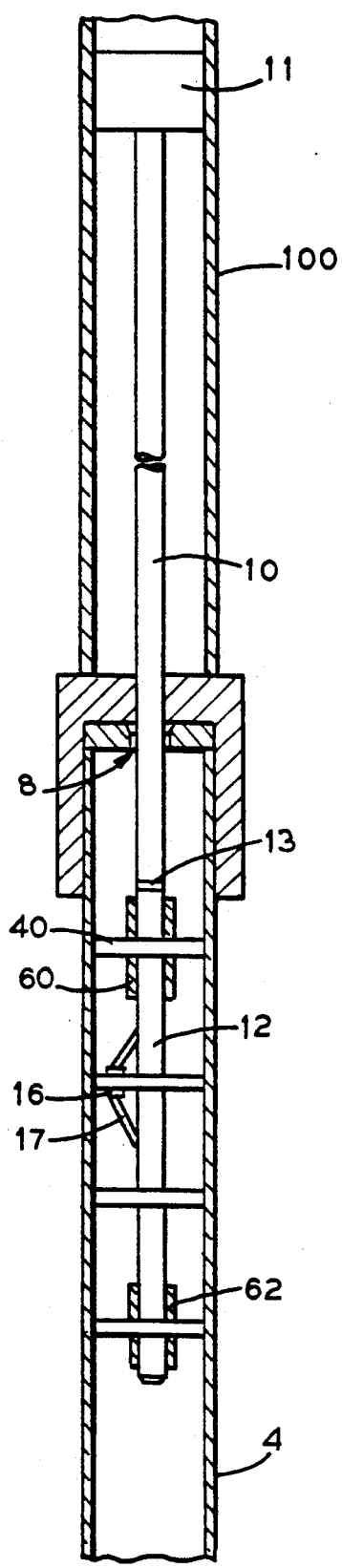
FIG. 4 is a composite longitudinal sectional view of the entire inspection device positioned on the upper internals.

Referring to the drawings, the invention embodied in FIGS. 1 and 4 comprises an inspection device for the upper internals 4 of a nuclear reactor which includes a generally tubular elongated upper probe support generally designated 10 having one or more bearings 11 for guiding a probe body upward and downward inside the system's outer housing support designated 100. The system's outer housing support 100 acts to hold the probe body 12 and probe support 10, and to position the probe on the upper internals and to provide axial positioning via a lead screw or other means. The probe body 12 is rotatably mounted at a bearing 13 to the lower end of probe support 10, for rotation around its longitudinal axis. Rotation is achieved by rotation drive means in the form of a motor 15, gear reducer 101 and encoder 14 connected thereto so that the exact rotational position of the probe body is known at all times.

Figure 5:
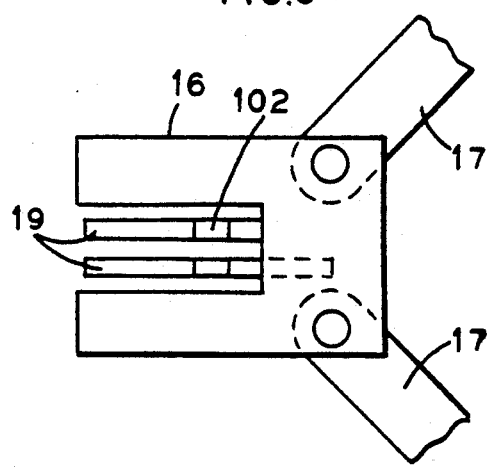
FIG. 5 is an enlarged view of the transducer with inspection arms instrumented with strain gauges.

A profile transducer 16 is mounted to the probe body 12 for radial movement on transducer drive means generally designated 18. Transducer 16 advantageously comprises a pair of opposite arms 19 equipped with strain gauges 102 as best shown in FIG. 5, which can be brought into contact with the surface of a channel, for measuring the profile of the channel as the transducer 16 moves radially along the channel. The transducer drive means 18 comprises a pair of arms 17 which each have one end pivotally mounted to the transducer 16, and an opposite end pivotally mounted to respective upper and lower follower blocks 20, 22 which are mounted for vertical sliding movement within the probe body 12. An upper lead screw 24 is threaded into the upper block 20 and is rotated through appropriate couplings and a gear train, by a transducer drive motor 30. A gearhead 28 connects the shaft of motor 30 to a second encoder 26 for providing an exact measurement of the rotational position for the motor shaft, and thus the radial position for transducer 16.

A lower lead screw 25 is threaded into the lower block 22 and is coupled by a rotation coupling 32, to the upper lead screw 24. The threads on lead screws 24 and 25 are reverse with respect to each other so that as the two lead screws rotate in the same direction, blocks 20 and 22 move in opposite directions to either advance or retract the transducer 16, in the radial direction.

Figure 2:
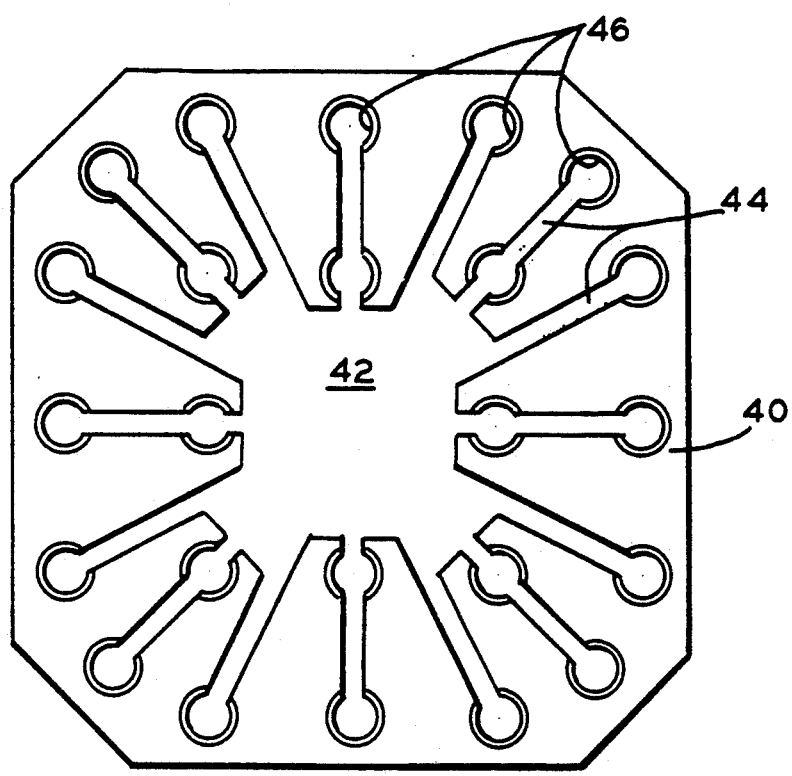
FIG. 2 is a top plan view of the support plate of the upper internals for a nuclear reactor.
Figure 3:
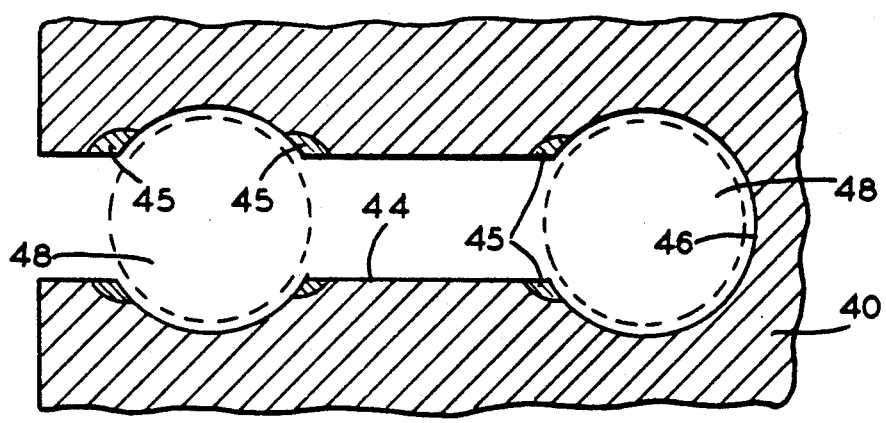
FIG. 3 is a partial top plan view of a control rod aperture and communicating channel to be inspected according to the present invention.

Before describing further details of the inspection device illustrated in FIG. 1, reference should be made to FIG. 4 and FIG. 2 which illustrate the environment of the invention. The upper internals of a nuclear reactor include a vertical structure approximately 14 feet tall with a small central aperture 8 at its top with horizontally extending support plates 40 containing a central aperture 42 having a plurality, in this case 16, of radially extending channels 44 projecting outwardly from the central aperture 42. Each radial channel 44 communicates with one or more vertically extending control rod apertures 46 which receive control rods 48 shown in FIG. 3. Referring to FIG. 3, the hatched area 45 in the vicinity of communication between channel 44 and aperture 46, is the site of most probable wear due to control rod vibrations. This is the area of greatest interest to be monitored with the device of the present invention.

Figure 6:
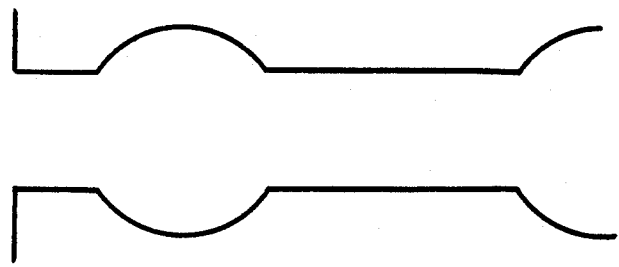
FIG. 6 is a typical Profile Plot generated by the inspection.

In operation, the outer housing support 100 lowers the probe body 12 vertically through the central aperture 42 so as to align the transducer 16 with the support plates 40 and channels 44. Motor 15 is operated and its rotational position is monitored by encoder 14 to rotate transducer 16 into a correct rotational orientation to access one of the channels 44. Motor 30 as monitored by encoder 26 is then operated to radially move the transducer 16 outwardly of the probe body 12. The transducer 16 measures the profile, and in particular areas of wear, of the channel 44. The encoders, motors and transducer are all connected to a computer (not shown) for either automatically or manually positioning and moving the transducer in acquiring data for each channel profile. A typical profile plot generated by this inspection device is illustrated in FIG. 6. Although strain gauges are illustrated, any other transducer or sensor can be utilized to measure the channel profile, for example, non-contact ultrasonic transducers.

As seen from FIG. 1, a spring 54 is connected between an ejector assembly 52 and the probe body 12. In the event of a probe drive malfunction while the transducer arms 17 are extended, the transducer 16 can be quickly retracted back into the probe body 12 by deactivating a pneumatic cylinder 50 thereby releasing the ejector assembly 52 which moves downward as the spring 54 contracts. The release of ejector assembly 52 causes coupling 32 to disengage the lead screws 24 and 25 from each other so as to retract the transducer 16. This method of recovery ensures that the probe can be retrieved, during a malfunction of the drive mechanism, without damage to itself or the upper internals of the nuclear reactor.

The probe body 12 is centered in the central aperture 42 by an upper bladder 60 and a lower bladder 62 which are both spooled around the probe body 12. Air or other pneumatic fluid is provided to the upper hollow interior of probe body 12 to inflate the upper bladder 60. Air reaches channel 66 to inflate the bladder 60 outwardly to center the upper part of the probe against the inner walls of the central aperture 42. In likewise fashion, tubing 105 is provided for supplying air or other pneumatic fluid to a T-shaped channel 70 within the lower portion of the probe body 12 which inflates the lower bladder 62. Tubing 68 supplies holding air to pneumatic cylinder 50 so that a loss of pressure inside the probe body 12 retracts the transducer 16.

An end cap 72 has a rounded outer surface to facilitate entry of the inspection device into the upper internals.

The probe body 12 is hermetically sealed above and below the area of transducer 16, the probe body 12 is cylindrical with a longitudinal slot 74 for permitting the transducer 16 and its arms 17 to be extended and retracted in the radial direction. The probe body 12 is thus sealed in all areas except for the area of the transducer 16.

While a specific embodiment of the invention has been shown and described in detail to illustrate the application of the principles of the invention, it will be understood that the invention may be embodied otherwise without departing from such principles.

What is claimed is:

1. An inspection device for the upper internals of a nuclear reactor having a support plate with a central aperture, a plurality of radial channels extending outwardly from the central aperture, and at least one control rod aperture communicating with each channel, said inspection device comprising:
   a. a housing;
   b. a probe support received in said housing;
   c. a probe body rotatably attached to said probe support;
   d. a profile transducer movably mounted in said probe body for radial movement relative thereto for sensing the profile of a radial channel in a support plate;
   e. drive means attached to said probe support and said probe body for causing rotation of said probe body;
   f. encoder means attached to said drive means for providing an exact indication of the rotational position of said transducer;
   g. transducer drive means mounted in said probe body for causing radial movement of said transducer;
   h. encoder means attached to said transducer drive means for providing an exact indication of the radial position of said transducer; and
   i. means for centering said probe body in the central aperture of a support plate.

2. The inspection device of claim 1, wherein said centering means comprises an inflatable bladder attached to said probe body on either side of said transducer.

3. An inspection device according to claim 1, wherein said transducer drive means comprises a pair of follower blocks slidably mounted to said probe body, a lead screw threaded into the blocks for rotation to move the blocks along said probe body and a transducer arm pivotally mounted between said transducer and each of the blocks whereby movement of the blocks apart from each other causes radial retraction of said transducer toward said probe body and movement of the blocks toward each other causes radial outward movement of said transducer from said probe body.

4. An inspection device according to claim 1, including emergency retraction means connected to said transducer drive means for retracting said transducer radially toward said probe body despite the position of said transducer due to said transducer drive means.

5. An inspection device according to claim 3, including a motor connected to the lead screw for rotating the lead screw.

* * * * *